Dec. 17, 1963  V. M. BARNES, JR., ETAL  3,114,318
ROCKET
Filed Nov. 22, 1960   7 Sheets-Sheet 1

INVENTORS
VERNON M. BARNES JR
JERRY A. BURKE JR.
IRVING R. KING
ROBERT L. WOLF

BY Stowell & Stowell

ATTORNEYS

Dec. 17, 1963   V. M. BARNES, JR., ETAL   3,114,318
ROCKET
Filed Nov. 22, 1960   7 Sheets-Sheet 3

INVENTORS
VERNON M. BARNES JR.
JERRY A. BURKE JR.
IRVING R. KING
ROBERT L. WOLF
BY Stowell & Stowell
ATTORNEYS Dec. 17, 1963 V. M. BARNES, JR., ETAL 3,114,318
ROCKET
Filed Nov. 22, 1960 7 Sheets-Sheet 7

INVENTORS
VERNON M. BARNES JR.
JERRY A. BURKE JR.
IRVING R. KING
ROBERT L. WOLF
BY Stowell & Stowell
ATTORNEYS …

United States Patent Office 3,114,318
Patented Dec. 17, 1963

3,114,318
ROCKET
Vernon M. Barnes, Jr. and Jerry A. Burke, Jr., Chesterfield County, and Irving R. King, Henrico County, and Robert L. Wolf, Chesterfield County, Va., assignors to Texaco Experiment Incorporated, Richmond, Va., a corporation of Virginia
Filed Nov. 22, 1960, Ser. No. 71,101
6 Claims. (Cl. 102—34.1)

This invention relates to a new and improved air traveling reaction propelled device and a launcher therefor and, more particularly, to a relatively small low-altitude rocket and launcher which are dependable in operation, relatively simple in construction and operation, and may be re-used for plural flights merely by recharging the reaction engine and launching mechanism.

The improved air traveling reaction propelled device has particular utility in low-altitude weather observation, weather prediction, cloud seeding, and air pollution studies and, depending on the mission for the rocket, the forward portion of the rocket body would carry instruments for sensing, transmitting and/or recording air temperature, barometric pressure, and humidity and means for obtaining air samples and/or means for discharging chaff, light reflecting metal particles, white or colored smoke, etc. to provide visual observation of wind direction and/or an approximation of wind speed.

It is an object of the invention to provide an air traveling reaction propelled device and launcher which may be safely used by amateur rocket groups and for training purposes for the armed services and the like.

Other objects and advantages are provided by an air traveling reaction propelled device and launcher therefor which, in general, comprises a rocket having a body portion adapted to receive a propellant composition, an outlet nozzle at one end of the body and communicating therewith, sealing means for the outlet nozzle, a launching tube adapted to slidably receive the rocket body adjacent the outlet nozzle, latch means cooperating with said launching tube and said outlet nozzle and maintaining the sealing means in sealed relation with the outlet nozzle, and means for propelling said rocket from the launching tube.

The novel features of the air traveling reaction propelled device and launcher will be more apparent to those skilled in the art from the following detailed description of the invention with reference to the accompanying drawings wherein.

*General Description of Rocket and Launcher Therefor*

Referring to the drawings and, in particular, to FIGS. 1, 2 and 3, 10 generally designates an air traveling reaction propelled device and launcher therefor, including a rocket generally designated 12 and launching structure generally designated 14.

Figure 3:
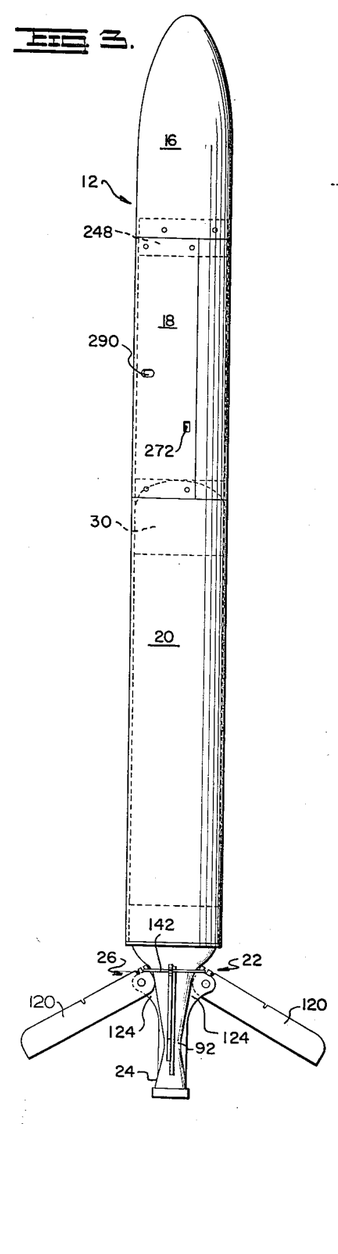
FIG. 3 is an enlarged elevational view of the rocket of the invention.

The rocket 12 generally comprises a nose section 16, an intermediate section 18, a propellant-storage section 20, and a tail section 22.

The tail section 22 generally includes an outlet nozzle 24, flight stabilizing means 26 and sealing means and rocket fueling mechanism 28.

The tail section 22 communicates with the propellant composition storage section 20 which section is sealed from the intermediate section 18 by a dome-shaped structural partition 30.

The intermediate section 18 and the nose section 16 are available to house the rocket instrumentation or as to be more fully described hereinafter, the intermediate section 18 may receive rocket recovery mechanism which is automatically actuated at a predetermined time to release a parachute stored therein.

As hereinbefore set forth, the nose section 16 may contain various types of instruments depending upon the mission of the rocket; i.e., radio transmitting and/or recording apparatus associated with temperature, barometric pressure, and humidity sensing means and means for obtaining samples of the air and/or for releasing smoke or chaff, etc.

The rocket is preferably constructed of light material such as spun or cast aluminum, die-casting metal, or high impact strength plastic or combinations thereof. In a preferred form of the present invention, the tail section 22 and the dome 30 of the propulsion section are die-cast along with certain portions of the instrumentation and recovery sections while the remainder of the rocket body is spun of sheet aluminum and the sections are secured together by conventional fastening means and/or by cementing the sections together with, for example, an epoxy adhesive.

Figures 1, 2:
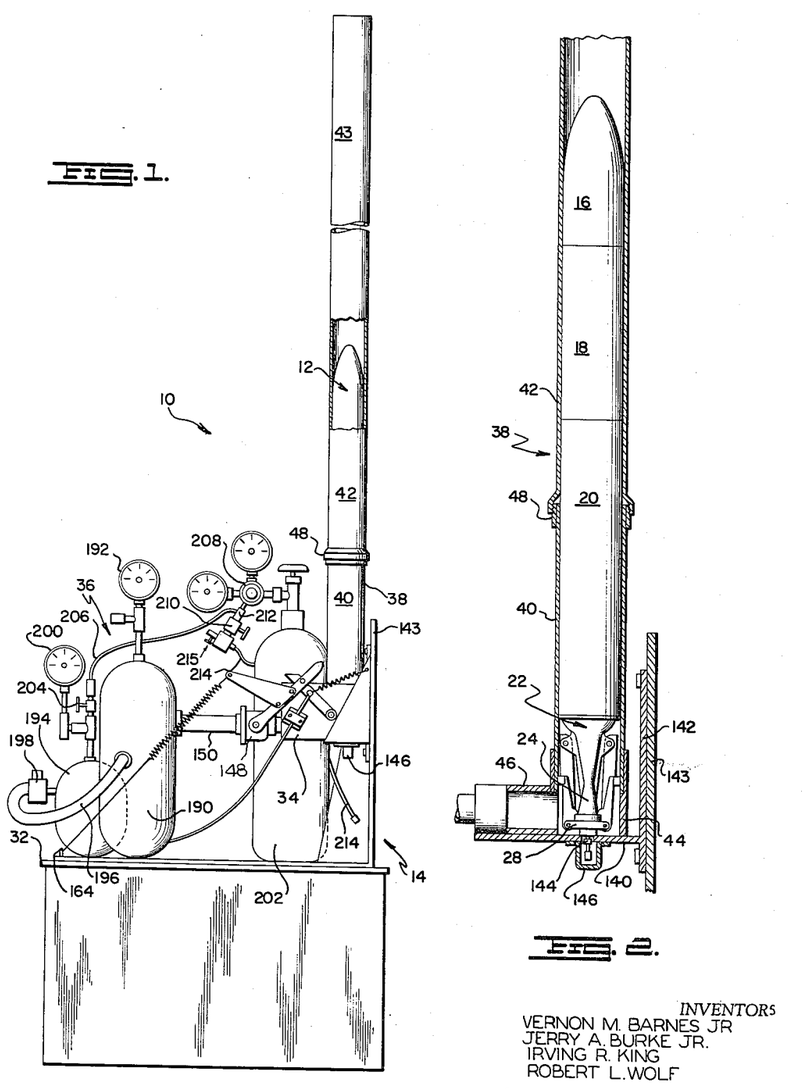
FIG. 1 is a fragmentary elevational view of an embodiment of the air traveling reaction propelled device and the launcher means therefor.
FIG. 2 is a fragmentary vertical view in partial section of a portion of the launching structure with the rocket in launching position.

The launching structure 14 generally includes a platform 32 which supports the rocket release mechanism 34, the fueling and initial propelling means 36 and a generally vertically extending launching tube structure 38. The launching tube is preferably made in several separable sections 40, 42 and 43, with the first or lowermost section 40 being supported by housing 44 adapted to receive the tail section of the rocket which, as to be more fully described hereinafter, has communication with the initial propelling means through a large conduit 46. With a rocket measuring approximately 30 inches, it has been found that a total length of launching section of about 11 feet has proved to be very satisfactory.

The length of the lowermost section 40 of the launching tube 38 is preferably less than the overall length of the rocket whereby the rocket may be conveniently inserted into the first section and the folded fins and nozzle sealing and propellant filling structures 28 properly positioned within the housing 44 of the launching tube structure 38. With the rocket position within the lowermost tubular section 40, one or more of the upper sections 42 and 43 may then be placed over the inserted rocket and secured to the next lower section by threaded coupling means generally designated 48 in FIGS. 1 and 2 of the drawings.

*Rocket Nozzle, Nozzle Seal and Filler Valve Structure*

The rocket nozzle, the nozzle seal and filler valve mechanism will be particularly described with reference to FIGS. 2 and 4 through 9. The tail section 22 of the rocket is preferably of die-cast construction and, as more clearly shown in FIG. 9, includes an upper portion 60 adapted to be snugly received in the lower end of the propulsion composition storage section 20. The upper portion 60 of the tail section 22 is provided with a cylindrical boss 62 which makes edge contact with the lower end of the tubular portion of the rocket forming the propulsion composition storage section. Further, as hereinbefore set forth, the upper section 60 of the tail section may be secured to the lower portion of the propulsion section 20 by cementing the elements together with, for example, an epoxy adhesive.

Figure 4:
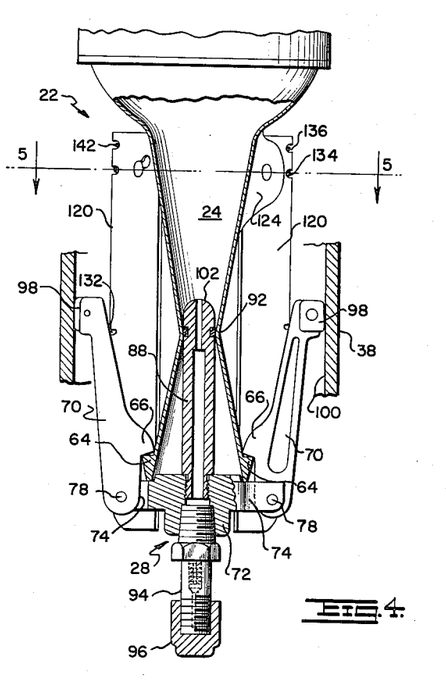
FIG. 4 is an enlarged fragmentary sectional view of the outlet nozzle end of the rocket particularly illustrating the stabilizing fins, the sealing means for the outlet nozzle and the latch means for maintaining the sealing means in sealing engagement with the nozzle prior to propelling the rocket from the launching structure.
Figure 6:
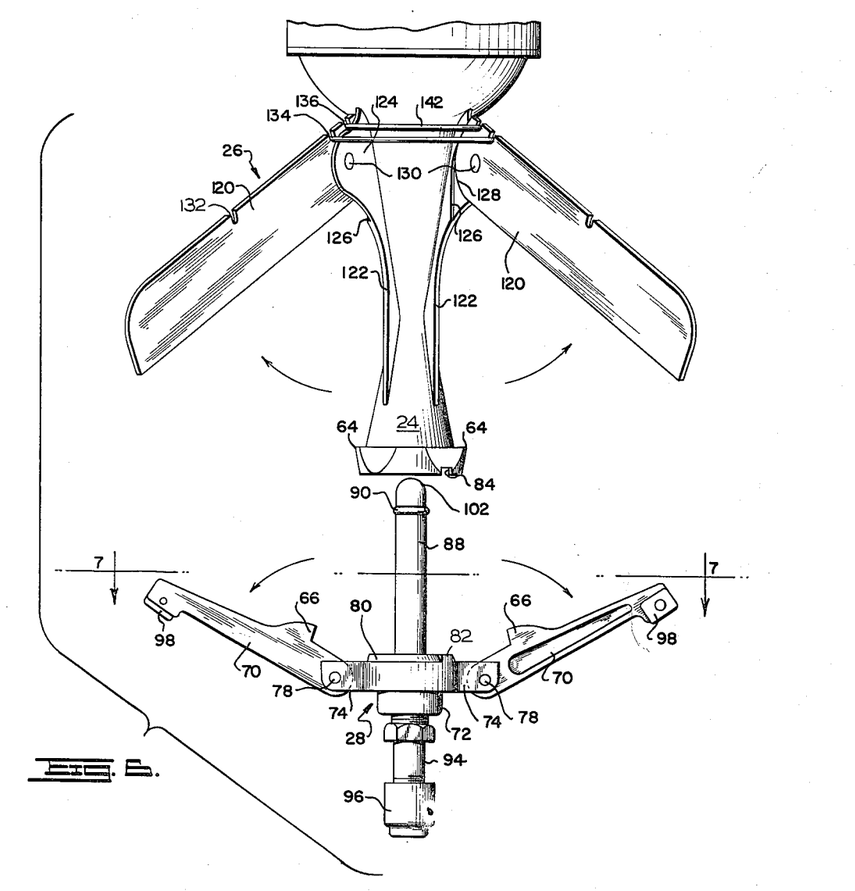
FIG. 6 is an exploded view illustrating the release of the nozzle sealing means and the unfolding of the stabilizing fins of the rocket upon ejection of the rocket from the launching means.
Figure 7:
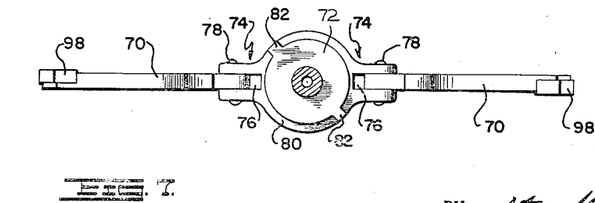
FIG. 7 is a section substantially on line 7—7 of FIG. 6.
Figure 8:
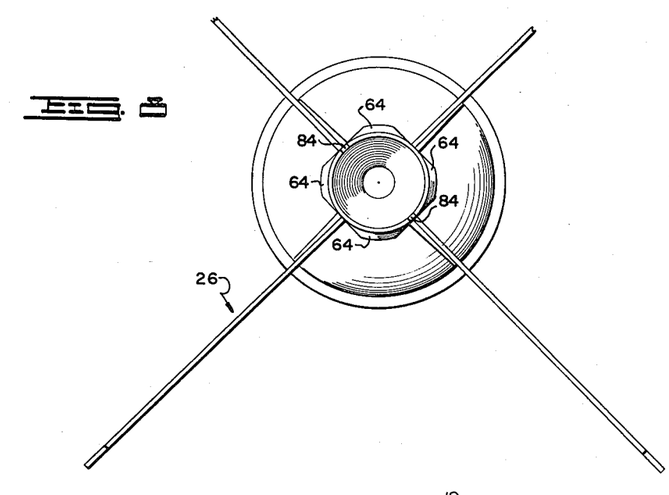
FIG. 8 is a plan view of the rocket looking forwardly toward the outlet nozzle and showing the stabilizing fins in the extended position.

The tail section is internally shaped to provide an outlet nozzle for the propelling composition and its lower end is provided with at least a pair of bosses 64 which project radially outward and, as to be more fully discussed, cooperate with lugs 66 carried by lever arms 70 of the latch means adapted to retain a combination propellant filling mechanism and nozzle seal 28 in propellant inserting and nozzle sealing relation to the outlet nozzle 24 of the rocket. Referring particularly to FIGS. 4, 6 and 7, the propellant filling and nozzle sealing mechanism generally includes a plug member 72 having a pair of wing extensions 74 which are bifurcated as at 76 and receive their respective lever arms 70. The lever arms 70 are mounted on pivot pins 78 whereby the arms can pivot from a nozzle sealing position as illustrated in FIG. 4 to a nozzle release position as illustrated in FIGS. 6 and 7.

Figure 5:
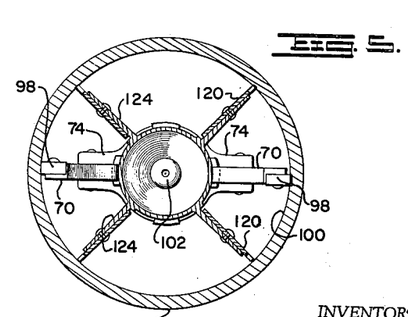
FIG. 5 is a sectional view substantially on line 5—5 of the structure shown in FIG. 4.

The plug 72 has a beveled edge portion 80 which edge is interrupted by a pair of bosses 82 adapted to be received in cooperating recesses 84 in the lower peripheral edge of the outlet nozzle 24. The recesses 84 are positioned relative to the bosses 64 such that with the bosses 82 in engagement with the recesses 84 lugs 66 on arms 70 will register with their cooperating bosses 64 adjacent the outlet end of the nozzle 24, as illustrated in FIGS. 4 and 5 of the drawings.

The plug member 72 has an upwardly extending nozzle insert 88 provided with a conventional O-ring sealing member 90 adjacent its upper end. The O-ring 90 is adapted to sealingly engage the inner wall of the outlet nozzle 24 adjacent the constriction 92 and thereby seal the propellant chamber and the upper section of the nozzle from the outlet end thereof. Where the sealing mechanism for the outlet nozzle also functions as the means for directing all or a portion of the propellant composition into the propellant storage section, the plug 72 and the vertically extending portion 88 are of hollow construction and the lower end of the plug 72 is adapted to threadedly receive a valve member 94.

The valve member 94 may conveniently comprise a conventional high pressure tire valve core and, as illustrated in the drawings, the lower end of the valve core 94 may be provided with a conventional valve core cap 96 to protect the valve mechanism from dirt and prevent damage thereto when the nozzle seal and filler mechanism drops back to earth following the discharge of the rocket from the launching device as to be more fully described hereinafter.

Each of the lever arms 70 is provided with a bearing pad such as illustrated Teflon inserts 98 adjacent the ends of the arms remote from their pivotal connections to the plug member 72. The Teflon bearing inserts 98 are adapted to engage the inner surface 100 of the launching tube 38 when the rocket is in launching position within the launching tube and the lugs 66 are in engagement with their respective bosses 64 at the outlet end of the nozzle structure 24. The launching relationship between the filler plug and sealing member and the launching tube 38 are more clearly illustrated in FIGS. 4 and 5 of the drawings. It will be particularly noted that the lugs 66 are provided with sloping faces whereby the pressure acting on the upper end 102 of the seal extension 88 readily brings about disengagement of the propellant fueling structure and nozzle seal as soon as the rocket is propelled from the launching tube 38.

*Stabilizing Fin Assembly*

Figures 9, 10:
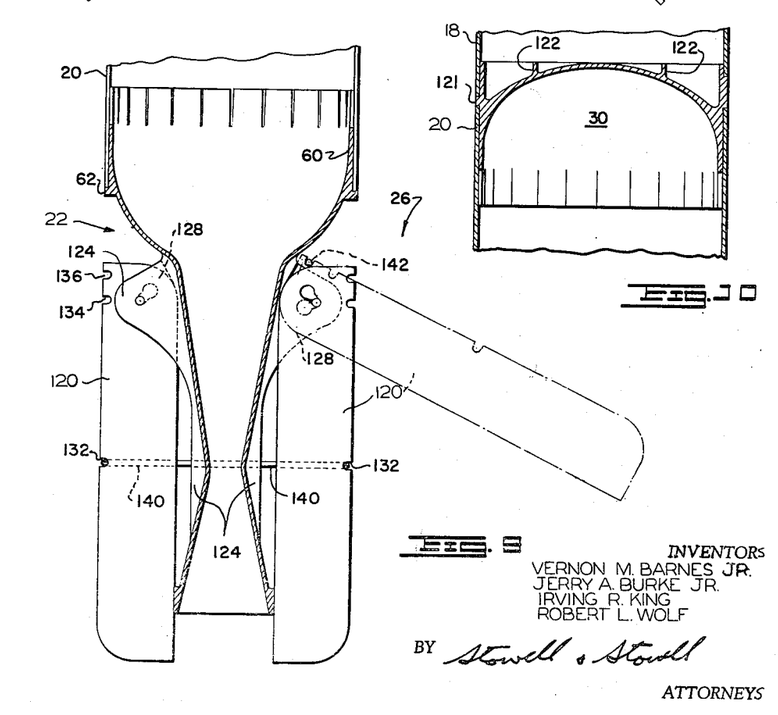
FIG. 9 is an enlarged fragmentary sectional view of the nozzle portion of the rocket showing a pair of the stabilizing fins in the folded position and in phantom lines one of said stabilizing fins in the unfolded position.
FIG. 10 is an enlarged sectional view of the head portion of the propellant composition carrying portion of the rocket.

Referring particularly to FIGS. 2 and 4 through 9, the discharge end 22 of the rocket also supports a plurality of radially spaced stabilizing fins 120. In the illustrated form of the invention four equally radially spaced fins 120 are employed, and each fin 120 is pivotally mounted by a pin 130 to the outlet nozzle structure 24. The nozzle structure 24 is also provided with four radially spaced flanges 122, the lower portions of which act as reinforcing means for the nozzle 24 while the upper ends 124 are adapted to pivotally mount the plural stabilizing fins 120. It will be particularly noted that the upper ends 124 of each of the flanges 122 is milled as at 126 to provide guideways for the fins and that the curved inner ends of the milled surfaces 126 cooperate with the curved upper ends 128 of the fins and limit the outward and upward movement thereof following the propulsion of the rocket from the launching means. It will also be particularly noted that the width of each of the fins 120 is so selected that when the fins are in their downwardly folded position such as illustrated in FIG. 9 that the fins do not project radially outwardly a distance greater than the maximum diameter of the rocket 12 whereby the rocket carrying the fins may be projected from the launching tube 38 without interference from the fins.

Each of the fins is provided with a plurality of recesses 132, 134 and 136. Recesses 132 are positioned in the fins below the pivotal axis of the fins to the flanges 124; recesses 134 are positioned substantially on the pivotal axis when the fins are in the folded position and above the pivotal axis when the fins are extended; and recesses 136 are positioned above the pivotal axis of the fins at all times. Prior to placing the rocket in its launching tube a resilient band designated 140 is received in the lowermost grooves 132 and holds the fins in the folded position as illustrated in FIG. 9. Upon inserting the rocket into the launching tube, the resilient band 140 is moved to the grooves 134 while a further resilient band 142 is maintained in the uppermost set of grooves 136. The band 140 positioned in grooves 134 cooperating with the resilient effect of band 142 positioned in the uppermost grooves 136 urge the fins 120 to the radially extended flight stabilizing position illustrated in FIGS. 3, 6 and 8 as soon as the rocket is propelled from the launching tube. It will be noted that with the fins 120 folded and resilient band 140 in groove 134, said band provides little tendency to urge the fins to the extended position as groove 134 is substantially on the pivotal axes of the fins. This reduces the drag of the edges of the fins on the inside wall of the launcher tube. When the rocket leaves the launcher tube and the fins are extended, groove 134 is above the pivotal axes of the fins and band 140 received therein cooperates with band 142 to urge and hold the fins in the extended position.

While specific forms of nozzle, nozzle seal, and stabilizing fins have been shown and described, it will be apparent that various modifications and changes may be made therein by those skilled in the art without departing from the scope of the invention. For example, the lower ends of at least a pair of the fins 120 may be provided with means cooperating with suitable lugs on the nozzle plug 72 to retain the seal in propellant filling and nozzle sealing position when the fins are in the downwardly folded position. This form of construction eliminates the need for the lever arms 70 which are pivotally mounted to the nozzle plug 72.

Further, it will be appreciated that the fins 120 may be pivotally mounted adjacent the lower end of the nozzle and fold upwardly and means may be associated with the upwardly folding fins to retain the nozzle plug 72 in the propellant filling and nozzle sealing position.

*Propellant Chamber and Propellant Composition*

Referring particularly to FIGS. 3, 9 and 10, the propellant composition-receiving portion of the rocket 20 is provided with a head 30 which head, like the tail section of the rocket, is preferably die-cast and provided with an annular flange 121 so that when the head portion 30 is joined to the shell of the recovery section 18 and the shell of the propellant-charged storage section 20, a relatively smooth outer surface is provided for the rocket. The head 30 may be mounted to the shell of the propellant composition storage compartment and to the recovery section 18 in any suitable manner and in the illustrated form of the invention an epoxy adhesive is employed as the mounting means. It will be particularly noted from FIG. 10 of the drawings that the die-cast head is provided with a plurality of ribs 122 which provide the necessary strength for the head without materially increasing the weight of the rocket.

The rocket of the invention is designed for use with non-burning propellants and preferably propellant compositions consisting of low temperature boiling, liquefiable normally gaseous materials; gases dissolved in a liquid or mixtures of liquids, or such gases dissolved in a solution of a solid or solids in a liquid or liquids and maintainable under pressure within the propellant composition storage compartment 20 of the rocket. Suitable propellant compositions for the rocket are, for example: ammonia, Freon, sulphur dioxide, methyl chloride, propane, butane; solutions of gases in liquids, such as, carbon dioxide in water, dimethyl ether in water, difluoroethane in alcohol, and the like.

While the above listed propellants and others may be satisfactorily employed in the rocket of the invention, the preferred propellant composition consists of carbon dioxide and acetone. The acetone-carbon dioxide propellant combination has been found to be particularly advantageous as carbon dioxide and acetone are relatively inexpensive, readily available, relatively non-toxic, non-corrosive and the pressure in a cylinder of liquid carbon dioxide is adequate for charging the rocket. Carbon dioxide is very soluble in acetone, and it has been found that about equal parts by weight of acetone and carbon dioxide under a pressure of about 500 p.s.i. at about room temperature has been found to provide very satisfactory results.

The volume increase of the acetone upon solution of the carbon dioxide is substantial. For example, starting with 500 cc. of acetone, the volume of the acetone-carbon dioxide system would be about 532 cc. at 132 pounds pressure; about 553 cc. at 170 pounds pressure; about 642 cc. at 300 pounds pressure; about 765 cc. at 400 pounds pressure; and about 968 cc. at 500 pounds pressure. The efficiency of the propellant composition consisting of acetone and carbon dioxide is substantial and a rocket having a diameter of about 2.5 inches and a length of about 30 inches from the nose 16 to the lower end of the nozzle 24 when charged with one pound of acetone and one pound of carbon dioxide and carrying a one-half pound payload for a total weight of 4 pounds will propel the rocket to an altitude of about 3000 feet at a maximum speed of about 540 feet per second from an initial speed of about 100 feet per second at the time the rocket leaves the launching tube. The maximum speed will be attained at the end of a thrust period of about 1.2 seconds permitting the rocket to coast about 3000 feet in about 12 seconds.

It will be apparent where higher pressures are used, greater thrust is obtainable and under higher pressure conditions, the acetone will dissolve a greater amount of carbon dioxide.

*Launching Structure and Method*

Referring particularly to FIGS. 1, 2, 11 and 12, the lower end 44 of the launching tube 38 is secured to a plate member 140 which plate is in turn secured to generally vertically extending plate members 142 and 143 whereby the lower end of the launching tube structure 38 is positioned above the launching platform 32. The plate member 140 is provided with an opening 144 adapted to receive the extended end of the filler valve structure 94 and a suitable removable protective cover 146 is provided to make the lower end of the launching assembly gas tight.

As hereinbefore set forth, the lower section 44 of the launching tube structure 38 is connected to a large conduit 46 which is connected to a quick-opening valve 148 which, in turn is connected to a source of pressurized gas by a conduit 150. The quick-acting valve 148 directs pressure fluid from the source of pressure fluid to the lower end of the launching tube and expansion of the gases in the tube propels the rocket 12 from the tube.

Figure 12:
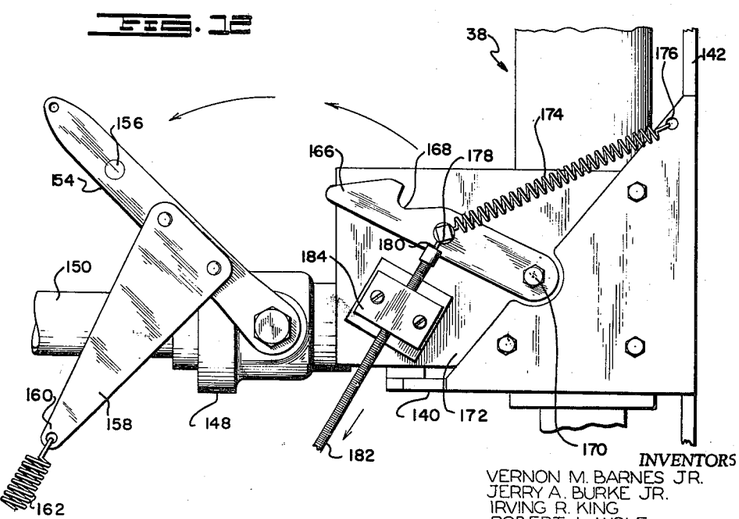
FIG. 12 is a view of the structure shown in FIG. 11 following the initiation of the launching cycle.

The quick-acting valve 148 is provided with a valve-actuating lever 154. The lever 154 is provided with a pin 156 which projects at right angles therefrom and the lever 154 also has secured thereto a lever arm 158. The extended end 160 of the lever arm 158 receives one end of a resilient biasing means illustrated as helical spring 162. The other end of the helical spring 162 is secured as at 164 to one end of the launching platform 32 and normally biases the valve actuating arm 154 in the open position as illustrated in FIG. 12 of the drawings. The valve is maintained in the closed position by a latch arm 166 provided with a pin-engaging recess 168. The latch arm 166 is pivoted as at 170 to the supporting frame 172 of the launching structure. The latch arm 166 is normally biased upwardly by resilient means shown as helical spring 174 having one end secured to the launching structure at 176 while the other end of the helical spring engages coupling 178 carried by the arm 166. The coupling 178 also receives one end of a flexible draft means or firing cable 180. The protective sheave 182 for the firing cable is secured by bracket means 184 to the side wall 172 of the launching structure. The other end, not shown, of the firing cable 180 is positioned at a point remote from the launching device 14.

Figure 11:
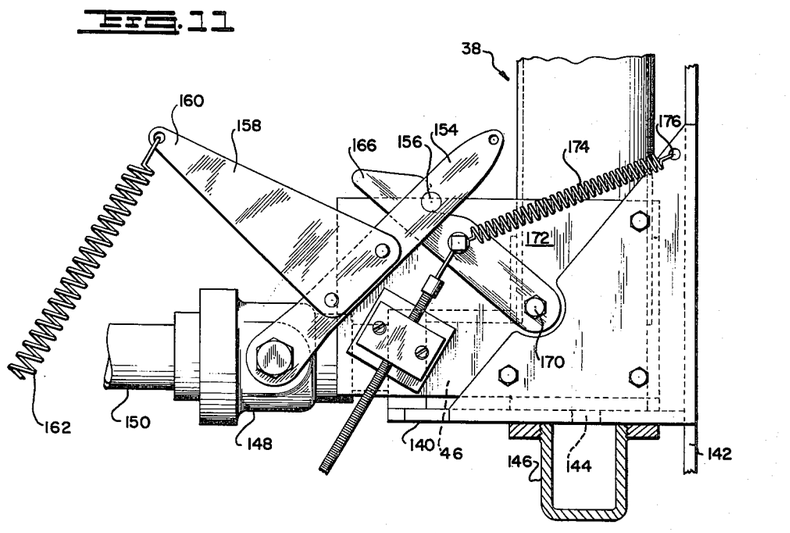
FIG. 11 is an enlarged fragmentary detailed view of the launching means for the air traveling reaction propelled device prior to initiation of the launching cycle.

The cooperation between the spring-urged latch arm 166, the valve arm 154 and its pin member 156 and the resilient means normally urging the valve to the open position are illustrated in the ready position in FIG. 11 wherein the pin 156 is engaged by the latch detent 168 of the latch arm 166 thereby holding the valve 148 in the closed position.

Referring particularly to FIG. 1 of the drawings, conduit 150 connected to the quick-release valve 148 connects the valve to a low-pressure reservoir generally designated 190. The low-pressure reservoir is conveniently provided with a conventional pressure gauge 192. The low-pressure reservoir 190 is connected to an intermediate pressure reservoir 194 by a conduit 196 through a conventional pressure-reducing valve 198. The intermediate pressure reservoir 194 is also conveniently provided with a conventional pressure gauge 200. The intermediate pressure reservoir 194 is connected to a source of gas or liquid under high pressure such as liquid carbon dioxide storage cylinder 202 via a manually actuated valve 204, conduit 206 and conventional pressure regulating valve 208.

A further manually actuated valve 210 leads from the output union 212 which valve controls the flow of carbon dioxide in the flexible rocket charging line 214. The extended end of the flexible rocket charging line 214 is provided with a threaded coupling adapted to be screwed to the threaded end of the valve stem 94 carried by the plug member 72 releasably engaging the extended end of the rocket nozzle 24.

*Operation*

With the nozzle plug 72 removed from the rocket 12 and the rocket held in the inverted position an acetone charge of about 1 pound is poured into the propulsion section 20 through the opening in the outlet nozzle 24. The nozzle plug is then inserted and the arm members are urged together so that the lugs 66 engage their respective bosses 64; the plural stabilizing fins 120 are held in the downwardly folded position with the resilient band means in fin grooves or notches 134 and 136. The rocket is then placed in the lowermost launching tube 40 so that the valve stem 94 and cap 96 project through the opening 144 in the plate 140. As a safety measure, the upper sections 42 and 43 of the launching tube are then attached to the lowermost section 40 prior to pressurizing the propellant section 20.

The valve cap 96 and the cap seal 146 are removed and the threaded coupling end of the flexible conduit 214 is screwed to the threaded end of the valve stem 94.

The pressure regulators 208 connected to the liquid carbon dioxide container 202 is set for approximately 500 pounds per square inch and the valve 210 is manually opened. The carbon dioxide storage cylinder 202 has an internal line extending to the bottom of the cylinder so that when the valve 210 is opened, liquid carbon dioxide is forced through the pressure regulator valve 208 and the rocket charging valve 210, flexible conduit 214, and into the propulsion section of the rocket. The rocket is pressurized to about 500 pounds per square inch whereby apporximately one pound of liquid carbon dioxide is mixed with one pound of acetone initially placed in the propulsion section 20 of the rocket. Since the carbon dioxide is charged principally as a cold liquid, it overcomes the heat evolved during solvation of the carbon dioxide in the acetone. Partial expansion of the carbon dioxide through the regulator 208 and the valve 210 cools the liquid sufficiently to bring about the substantial balance with the heat evolved.

When the propulsion section 20 is charged to a pressure of about 500 pounds per square inch, the valve 210 is closed and the pressure is bled from the flexible filling line 214 via bleed valve 215, the cap 96 is replaced on the valve stem 94 and the sealing cap 146 is replaced rendering the launching tube 38 substantially gas-tight at the lower end.

The quick-release valve 148 is then closed and the valve actuating arm 154 is latched in the valve closed position by the latch arm 166 as illustrated in FIG. 11 of the drawings. The intermediate pressure reservoir 194 is then pressurized by opening the valve 204 and charging the container with carbon dioxide from the carbon dioxide storage container 202. While intermediate pressure reservoir 194 is being filled, the low pressure reservoir 190 is also being filled to approximately 20 pounds p.s.i. via pressure reducing valve 198 and conduit 196. With the low and intermediate storage vessels 190 and 194, respectively, pressurized to 20 pounds and 200 pounds pressure, valve 204 is closed and the valve connected to the high pressure liquid carbon dioxide storage container 202 is closed. The rocket is then ready for launching.

Launching of the rocket is accomplished by pulling on the extended end of the firing cable 180 to overcome the tension of spring 174 whereby latch arm 166 is urged downwardly releasing pin 156 from the latch arm detent. With the pin 156 released, spring 162 urges the valve actuating handle 154 to the valve open position. Opening of the valve 148 admits carbon dioxide under 20 pounds per square inch pressure from the low pressure reservoir 190 into the lower end of the launching tube via conduit 46. The sudden release of the carbon dioxide into the launching tube accelerates the rocket 12 to about 100 feet per second when the rocket is about 30 inches tall and about 2½ inches in diameter and weighs about 4 pounds in about .2 second. As the rocket leaves the launching tube, the nozzle plug 72 is unlatched from the lower end of the outlet nozzle 24 and the pressure of the propelling charge forces the sealing plug 88 from the nozzle and the carbon dioxide-actone propellant charge take over and accelerates the rocket to about 540 feet per second with the propellant charge of about 1 pound of acetone and 1 pound of carbon dioxide providing thrust for about 1 to 1.2 seconds. The rocket then coasts to about 3,000 feet in about 12 seconds.

*Rocket Recovery Device and Timing Mechanism Therefor*

Figure 13:
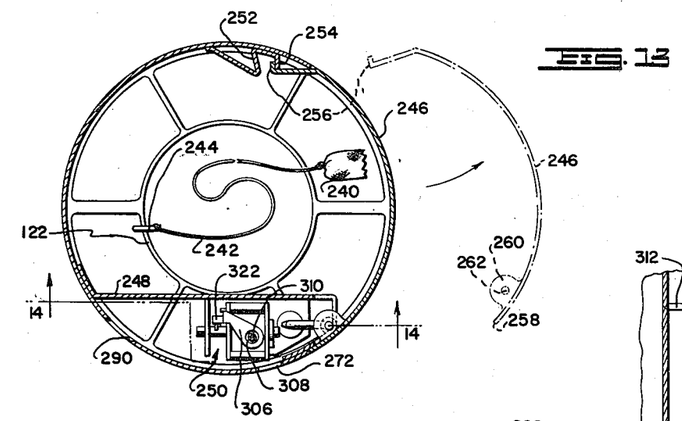
FIG. 13 is a section substantially on line 13—13 of FIG. 14 showing a portion of the automatic means for releasing the recovery parachute.

Referring particularly to FIGS. 3, 12, 13, 14 and 15, where the rocket of the invention is to be re-used or carries instrument packages which are to be recovered, the center section 18 of the rocket houses rocket recovery means which in the illustrated form of the device includes a parachute indicated at 240 in FIG. 13 with the lanyard 242 of the parachute attached as at 244 to an opening provided in one of the ribs 122 of the top 30 of the propellant charge containing section 20 of the rocket. The recovery section 18 includes a removable panel or door 246 which extends between the upper portion of the dome 30 of the propellant charge containing section 20 and a ring member 248 which separates the recovery section 18 from the nose section 16. The ring member 248 is employed as a means for securing the shells of the recovery and nose sections together.

Within the shell or wall of the recovery section 18 is a vertically extending wall 248 which supports the door latch control and timing mechanism generally designated 250 and separates this mechanism from the parachute storage area. Opposite the wall 248 the compartment 18 is provided with a member 252 which extends the length of the recovery section 18 and is shaped to provide an internal hinge piece 254. One edge of the door 246 is shaped to provide the cooperating hinge piece 256 while adjacent the other edge 258 of the door 246 there is provided a keeper plate 260 having a bore 262 therein. The opening 262 in the keeper plate 260 is adapted to receive a latch pin 264. The latch pin 264 is shown in the door latching position in FIGS. 13 and 14 of the drawings and it will be seen that a spring 266 acting between a ferrule 268 carried by a portion of the latch bar 264 and a plate 270 bent from a portion of the partition 248 urges the latch bar 264 in the door latching position.

A small opening 272 illustrated in FIGS. 3 and 13 of the drawings is provided in a wall of the recovery section 18 to permit the insertion of a manual door-opening implement. The manual door-opening implement engages the lower portion 274 of the latch bar 264 and urges the bar downwardly against the tension of spring 266 whereby the bar is withdrawn from the opening 262 in the latch plate 260 and the door 246 may be removed from the recovery section for repacking or insertion of the recovery parachute 240.

In operation of the rocket, the latch pin 264 is withdrawn from the latch or keeper plate 260 by an automatic timing mechanism generally referred to with the reference numeral 250. The latch pin withdrawing mechanism includes a conventional train of gears 276, 278, 280, 282 and 284, all more clearly shown in FIG. 14.

Figure 14:
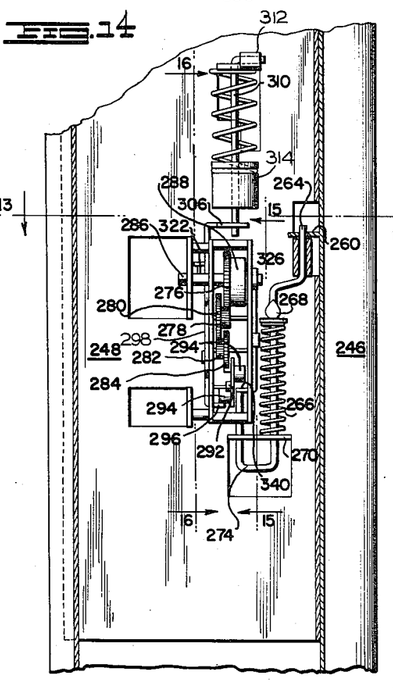
FIG. 14 is a fragmentary vertical section substantially on line 14—14 of FIG. 13.
Figure 15:
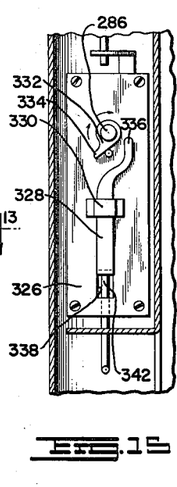
FIG. 15 is a section substantially on line 15—15 of FIG. 14.
Figure 16:
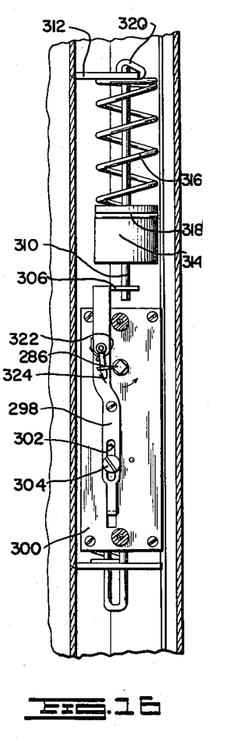
FIG. 16 is an enlarged vertical sectional view substantially on line 16—16 of FIG. 14.
Figure 17:
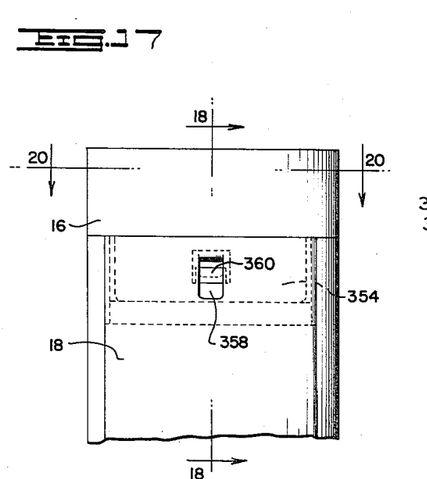
FIG. 17 is a fragmentary elevational view of a modified form of recovery section door release mechanism of the invention.
Figure 18:
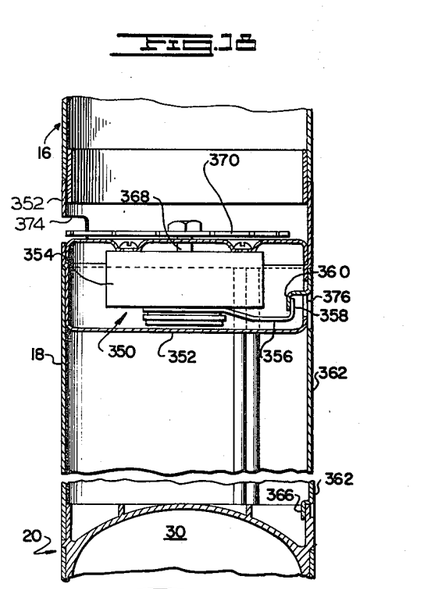
FIG. 18 is a sectional view substantially on line 18—18 of FIG. 17.
Figure 19:
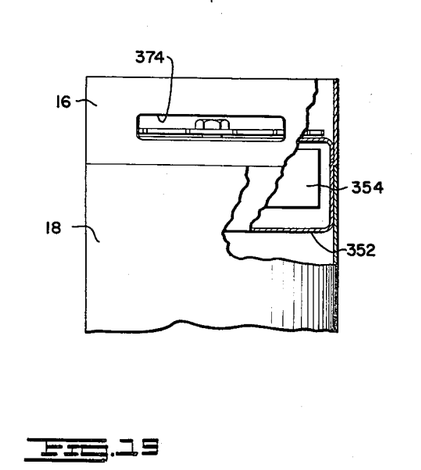
FIG. 19 is a fragmentary view of the opposite side of the structure shown in FIG. 17 with portions broken away to more clearly illustrate the positioning of the timing mechanism carried thereby.
Figure 20:
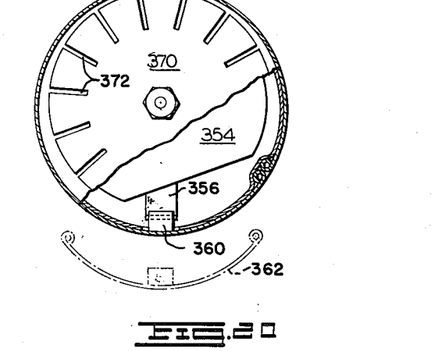
FIG. 20 is a fragmentary sectional view substantially on line 20—20 of FIG. 17.

The first gear 276 of the gear train is connected to a shaft 286 which shaft cooperates with a conventional convoluted spring type motor 288. The extended end of the shaft 286 is adapted to receive the spring motor winding key and the shaft is accessible through a further opening 290 provided in the wall of the recovery section 18. The lowermost gear 284 engages a conventional escapement mechanism 292 provided with a pair of opposed weights 294 carried on opposite wings of the escapement arm. One of the weights is engaged by a bracket 296 forming a part of plate 298 mounted on side wall 300 of the timing mechanism 250. The plate 298 is slidably mounted to the side wall 300 by means of slotted opening 302 and the cooperating pin 304. When the plate 298 is in the upwardly extended position as illustrated in FIGS. 14 and 16, the arm 296 engages the escapement weight 294 and prevents movement of the timing mechanism.

The sliding plate 298 is provided with a further arm 306 which arm is provided with a bore 308 therethrough. The bore 308 receives one end of a rod 310, the other end of which is secured to a boss 312 formed from a portion of the wall 248. Slidably mounted on the rod 310 is a weight 314. The weight 314 is normally maintained in a position out of engagement with the arm 306 by a helical spring 316, the lower end of which engages a groove 318 in the upper end of the weight 314 and the other end 320 of the spring 316 is attached about the boss 312.

The plate 298 is also provided with an arm 322 and cooperating spring and when shaft 286 is rotated clockwise for winding the spring motor arm 322 is engaged by a small pin 324 secured to the winding shaft 286 of the timing mechanism which urges the sliding plate 298 upwardly to positively stop the actuation of the spring operated timing gear train mechanism and thereby set the timing mechanism in a ready position. After the timer has been actuated by weight 314 and plate 298 is moved downward, the arm 322 and its cooperating spring permit pin 324 to return past the catch as the timer motor unwinds.

The other wall 326 of the timing mechanism slidably carries a plate 328 in a guide bracket 330. The upper end of the plate 328 cooperates with a cam 332 secured to rotate with shaft 286 of the timing mechanism, whereby upon actuation of the timing mechanism, the surface 334 of the cam plate 332 engages the top surface 336 of the slide plate 328 and urges the plate downwardly.

The lower end of the slide plate 328 is bent inwardly and passes through a slotted opening 338 with the most inward end 340 engaging the extended end 342 of the latch bar 264 whereby downward movement of the slide plate 328 withdraws the latch pin 264 from the opening in the latch plate 260 whereby the door 246 will be forced open by the pressure of the packed parachute after which the parachute 240 is swept from the recovery compartment 18. The door of the recovery compartment may be attached to the parachute by a fine lanyard to permit recovery of the door along with the rest of the rocket.

The timing mechanism 250 is actuated by launching of the rocket 12. The rapid acceleration of the rocket 12, as it is launched from the launching tube, causes the weight 314, normally prevented from making contact with the boss or arm 306 of the timing mechanism, to strike the arm 306, and force the plate 298 downwardly whereby the arm 296 at the lower end of the plate is moved out of engagement with the weight 294 of the escapement mechnaism 292. With the escapement mechanism free, the timing cycle begins to function and the door 246 is opened when the cam surface 334 forces the latch bar 264 out of engagement with the latch plate 260. It has been found that very satisfactory operation is provided where the weight 314 is about 5 grams. However, it will be appreciated that weight of the timer starting mechanism is determined in part by the smoothness of operation of the sliding plate 298 and the acceleration imparted to the rocket as it is launched from the launching tube.

In FIGS. 17, 18, 19 and 20, a further form of inertia-actuated timing mechanism for the recovery section is illustrated. In the form of the invention shown in FIGS. 17 through 20, the timing mechanism generally designated 350 is maintained in a cylindrical cup 352, the lower end of which is received in the recovery section shell. The upper end of the cup 352 receives a coupling 353 which provides the means for securing together shell sections 16 and 18 of the rocket.

In this form of the invention, a spring motor actuated timing gear train similar to that illustrated in FIGS. 13 through 16 is mounted in a timer housing 354. The timer is adapted to urge latch arm 356 downward and the latch arm 356 is provided with an upstanding end 358 which engages a cooperating boss 360 carried by the door 362 whereby the downward movement of arm 356 releases the door 362 at its upper end. The lower end of the door 362 is provided with one or more depending bosses 366 which engage the upper edge of the cast head 30 dividing the propellant containing chamber and the recovery chamber 18. The latch arm 356 may be mounted to rotate with one of the shafts of the timing gear train whereby upstanding end 358 is rotated out of engagement with the boss 360 carried by the door 362 upon actuation of the timing gear train.

The timing gear train, not shown, is started by an inertial device consisting of a weight normally maintained out of engagement with a starting lever by resilient means as described with reference to the form of the timing mechanism shown in FIGS. 13 through 16.

The timer 350 is provided with a winding shaft 368, which shaft has secured for rotation therewith a circular winding disc 370. The disc 370 is notched as illustrated at 372 or provided with some form of indicia to indicate the amount of movement of the winding disc 370 required to set the timer for the desired period of time between actuation of the inertial timer starting means and release of the door 362 to the recovery compartment 18.

Access to the winding disc 370 is through an elongated opening 374 in the cup 352. It will be particularly noted from FIG. 20 of the drawings that the timer mechanism housing 354 is eccentrically mounted in cup 352 whereby the winding disc 370 is readily accessible for winding and setting the timer through the arcuate opening 374 in the cup 352. It will also be particularly noted that an opening 376 is provided in the door 362 and in the cup 352 to permit manual actuation of the door release latch 358.

In the plural forms of the door release means for the recovery section 18, the respective doors extend only throughout the recovery section. It will be apparent, however, that the releasable doors may extend into a portion of the nose section 16 of the rocket to provide exposure of the instruments carried therein to the atmosphere where such exposure is necessary for the proper operation of sensing and/or collecting devices.

It will further be apparent to those skilled in the art that where, for example, a humidity sensing mechanism and/or a temperature sensing element are carried by the rocket, that either opening of the recovery section door or movement of elements in the timing mechanism may be employed to bring about movement of the sensing elements or the like from a retracted storage position within the nose 16 to an extended position outside of the shell of the nose section of the rocket. Further release of the door of the recovery stage may also release an antenna for transmission of radio signals back to ground stations.

From the foregoing detailed description of the improved air traveling reaction propelled device and launching means therefor, it will be seen that the aims and objects of the invention have been fully accomplished. While particular embodiments and methods of operation of the present invention have been disclosed for purposes of illustration, it will be apparent to those skilled in the art that various modifications may be made in the form of the rocket and the launcher therefor without departing from the scope of the invention as defined in the appended claims.

We claim:

1. In an air traveling rocket having a body portion and an outlet nozzle, a parachute maintained in a parachute compartment in said body portion, a door for said parachute compartment, latch means normally maintaining said compartment door in the latched position, timing gear means associated with said door latching means for releasing said latch means, an axially slidable stop member, means urging said stop member into a forward timing gear means engaging lock position, and inertial means for initiating the actuation of said timing gear means, said inertial means comprising an axial acceleration sensitive mass, resilient means urging said mass into a forward position permitting said stop member to engage the timing gear means, the resiliency of said resilient means and the weight of said mass being so selected that the axial acceleration sensitive mass urges said stop member axially downwardly out of engagement with the timing gear means upon forward axial acceleration of the air traveling rocket.

2. The invention defined in claim 1 wherein said timing gear means includes a spring actuated gear train and escapement mechanism for said spring actuated gear train.

3. The invention defined in claim 2 wherein said stop member is engageable with said escapement mechanism and said inertial means urges said stop member from engagement with said escapement mechanism.

4. In a fin stabilized reaction propelled rocket having a body portion and a reaction outlet nozzle, a compartment in the body portion forward of the reaction outlet nozzle, a recovery parachute maintained in the compartment, a parachute release door for said compartment, and means normally maintaining said parachute release door in a latched position, said means including a keeper plate having an opening therein carried by said door, a latch pin, resilient means normally urging one end of the latch pin into the opening in the keeper plate carried by the compartment door, a latch pin release arm, timing gear means adapted to actuate said arm and urge said latch pin into the compartment door release position, an axially slidable stop member associated with said timing gear means, means urging said stop member into a forward timing gear means engaging lock position, inertial means for initiating the actuation of said timing gear means, said inertial means comprising an axial acceleration sensitive mass, resilient means urging said mass into a forward position permitting said stop member to engage the timing gear means, the resiliency of said resilient means and the weight of said mass being so selected that the axial acceleration sensitive mass urges said stop member axially downwardly out of engagement with the timing gear means upon forward axial acceleration of the fin stabilized reaction propelled rocket.

5. In a fin stabilized reaction propelled rocket having a body portion and a reaction outlet nozzle, a compartment in the body portion forward of the reaction outlet nozzle, a recovery parachute maintained in the compartment, a parachute release door for said compartment, and means normally maintaining said parachute release door in a latched position, said means including a keeper plate having an opening therein carried by said door, a latch pin, resilient means normally urging one end of the latch pin into the opening in the keeper plate carried by the compartment door, a latch pin release arm, timing gear means adapted to actuate said arm and urge said latch pin into the compartment door release position, an axially slidable stop member associated with said timing gear means, means urging said stop member into a forward timing gear means engaging lock position, inertial means for initiating the actuation of said timing gear means, said inertial means comprising an axial acceleration sensitive mass, spring means suspending said mass above said stop member, the resiliency of the spring means and the weight of the mass being so selected that the weight urges said stop member axially downwardly out of engagement with the timing gear means upon forward axial acceleration of the fin stabilized reaction propelled rocket and manually resettable means for said axially slidable stop member.

6. The invention defined in claim 1 including an opening in the body portion of the rocket adjacent said latch means for manually releasing said door for the parachute compartment.

References Cited in the file of this patent

UNITED STATES PATENTS

| | | |
|---|---|---|
| 757,825 | Maul | Apr. 19, 1904 |
| 847,198 | Maul | Mar. 12, 1907 |
| 1,191,299 | Goddard | July 18, 1916 |
| 1,571,617 | Bassett | Feb. 2, 1926 |
| 1,777,547 | Bold | Oct. 7, 1930 |
| 2,733,699 | Krinsky | Feb. 7, 1956 |
| 2,814,251 | Kuhn et al. | Nov. 26, 1957 |
| 2,841,084 | Carlisle | July 1, 1958 |